United States Patent
Sekiya et al.

(10) Patent No.: US 11,479,218 B2
(45) Date of Patent: Oct. 25, 2022

(54) VEHICLE OPERATING DEVICE

(71) Applicant: TOYOTA JIDOSHA KABUSHIKI KAISHA, Toyota (JP)

(72) Inventors: Yoshihide Sekiya, Chiryu (JP); Daisuke Itagaki, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/324,768

(22) Filed: May 19, 2021

(65) Prior Publication Data

US 2021/0362695 A1 Nov. 25, 2021

(30) Foreign Application Priority Data

May 21, 2020 (JP) .............................. JP2020-089129

(51) Int. Cl.
*B60T 7/10* (2006.01)
*B60K 26/02* (2006.01)

(52) U.S. Cl.
CPC .............. *B60T 7/102* (2013.01); *B60K 26/02* (2013.01); *B60K 2026/025* (2013.01); *B60K 2026/029* (2013.01)

(58) Field of Classification Search
CPC ... B60T 7/102; B60K 26/02; B60K 2026/029; B60W 30/18181
See application file for complete search history.

(56) References Cited

U.S. PATENT DOCUMENTS

| | | | | |
|---|---|---|---|---|
| 4,562,893 A * | 1/1986 | Cunard | ................... | B60L 50/52 180/22 |
| 6,633,804 B2 * | 10/2003 | Dix | ...................... | B60G 17/005 701/50 |
| 6,898,496 B2 * | 5/2005 | Chernoff | ......... | B60W 30/18181 180/443 |
| 6,904,345 B2 * | 6/2005 | Yanaka | ................... | B62D 1/12 701/1 |

FOREIGN PATENT DOCUMENTS

JP    8-272439 A    10/1996

* cited by examiner

*Primary Examiner* — Thomas C Diaz
(74) *Attorney, Agent, or Firm* — Sughrue Mion, PLLC (57) ABSTRACT

A vehicle operating device including an operating member operable by a driver and configured to: issue, to a drive system, a command to apply a drive force in a forward direction when a first-direction operation of the operating member from its neutral position in a first direction is performed in a state in which the vehicle is at a stop or running forward; issue, to the drive system, a command to apply a drive force in a backward direction when a second-direction operation of the operating member from the neutral position in a second direction different from the first direction is performed in a state in which the vehicle is at a stop or running backward; and issue, to a brake system, a command to apply a braking force as an opposite-direction-operation-dependent braking force when the second-direction operation is performed in a state in which the vehicle is running forward.

7 Claims, 8 Drawing Sheets

VEHICLE OPERATING DEVICE

CROSS REFERENCE TO RELATED APPLICATION

The present application claims priority to Japanese Patent Application No. 2020-089129, which was filed on May 21, 2021, the disclosure of which is herein incorporated by reference in its entirety.

BACKGROUND

Technical Field

The following disclosure relates to an operating device installed on a vehicle and including an operating member operable by a driver, the operating device being configured to issue a command corresponding to an operation of the operating member by the driver to a drive system and a brake system of the vehicle.

Description of Related Art

For instance, a vehicle as disclosed in Patent Document 1 (Japanese Patent Application Publication No. 8-272439) has been recently developed in which one operating member such as a joystick is provided in place of conventional operating members such as an accelerator pedal and a brake pedal. In such a vehicle, both an accelerating operation and a braking operation can be performed by operating the one operating member.

SUMMARY

An operating device installed on the vehicle described above is configured such that a command for applying a drive force in a forward direction to the vehicle is issued when the joystick as the operating member is operated from a neutral position thereof in the forward direction and such that a command for decreasing the drive force and applying a braking force with an appropriate magnitude to the vehicle is issued when the joystick is located at the neutral position. In the vehicle equipped with the thus configured operating device, the braking force applied to the vehicle is not reflective of a driver's intention. Thus, there remains room for improvement in commands as to the braking force, and some modifications can enhance the utility of the operating device. Accordingly, an aspect of the present disclosure is directed to a vehicle operating device with high utility.

In one aspect of the present disclosure, an operating device installed on a vehicle and including an operating member operable by a driver is configured to issue a command corresponding to an operation of the operating member by the driver to a drive system and a brake system of the vehicle, wherein the operating device allows a first-direction operation that is an operation of the operating member from a neutral position thereof in a first direction and a second-direction operation of the operating member from the neutral position in a second direction different from the first direction, wherein, when the first-direction operation is performed in a state in which the vehicle is at a stop or the vehicle is running forward, the operating device issues, to the drive system, a command to apply a drive force in a forward direction to the vehicle, wherein, when the second-direction operation is performed in a state in which the vehicle is at a stop or the vehicle is running backward, the operating device issues, to the drive system, a command to apply a drive force in a backward direction to the vehicle, and wherein, when the second-direction operation is performed in a state in which the vehicle is running forward, the operating device issues, to the brake system, a command to apply a braking force as an opposite-direction-operation-dependent braking force to the vehicle.

In the vehicle equipped with the operating device constructed as described above, when the operating member is operated in the second direction beyond the neutral position in a state in which the vehicle is running forward by an operation of the operating member in the first direction, the braking force is applied to the vehicle. A driver's operation of one operating member enables application of both the drive force and the braking force to the vehicle. In addition, the operating device may be configured to change a magnitude of the braking force in accordance with the operation amount of the operating member. With this configuration, in a situation in which sudden braking is required, for instance, a relatively large braking force can be applied to the vehicle by a driver's operation, in other words, a relatively large braking force can be applied in accordance with a driver's intention.

Various Forms

The operating member of the operating device according to the present disclosure may have any structure as long as it can be operated in mutually different two directions from the neutral position. A joystick or the like is typically employed as the operating member. The first direction and the second direction may be mutually opposite directions with respect to the neutral position. Each of the first direction and the second direction is not limited to a linear direction but may be a direction along one circumference of a circle centered around a certain point. From the viewpoint of ease of operation, the first direction may be a direction directed toward a front side of the vehicle, and a second direction may be a direction directed toward a rear side of the vehicle.

In the operating device of the present disclosure, the state in which the vehicle is running forward and the state in which the vehicle is running backward may be determined based on a rotational direction of wheels, for instance. Further, each of the state in which the vehicle is running forward and the state in which the vehicle is running backward does not necessarily mean only a state in which the vehicle is actually running forward or backward. In a case where the drive system is configured such that the running state of the vehicle is switched between forward running and backward running by shifting gears of a transmission, it may be determined that the vehicle is running forward or backward based on the state of the shifted gears. In a hybrid system in which mode switching is performed for switching the running state between forward running and backward running, it may be determined that the vehicle is running forward or backward depending on whether a forward running mode is selected or a backward running mode is selected.

In the operating device of the present disclosure, the command to apply, to the vehicle, a drive force in the forward direction (hereinafter referred to as "forward drive force" where appropriate) based on the first-direction operation does not necessarily indicate directly the magnitude of the forward drive force to be applied. Similarly, the command to apply, to the vehicle, the drive force in the backward direction (hereinafter referred to as "backward drive force" where appropriate) based on the second-direction operation does not necessarily indicate directly the magnitude of the backward drive force to be applied. Specifically, each of the command to apply the forward drive force and the command to apply the backward drive force may indicate, to the drive system, a speed at which the vehicle should run forward or backward. (The speed will be referred to as "target vehicle running speed" where appropriate.) In this instance, the drive system may determine the drive force based on the target vehicle running speed and a speed at which the vehicle is actually running (hereinafter referred to as "actual vehicle running speed" where appropriate) and may apply the determined drive force to the vehicle. The drive system may be a drive system including an engine as the drive source, a drive system including an electric motor as the drive source, or may be a drive system including both the engine and the electric motor each as the drive source (e.g., a hybrid system).

The brake system may be a hydraulic brake system, an electric brake system (configured to push friction members against a rotary body by a force of an electric motor), or the like. In a case where the drive system includes the electric motor as the drive source, the electric motor may be utilized as an electric generator to generate a regenerative braking force. In a case where the drive system is configured to apply the regenerative braking force to the vehicle, the drive system may be regarded as a part of the brake system.

In the operating device of the present disclosure, the command to apply the opposite-direction-operation-dependent braking force may be issued not only when the second-direction operation is performed in the state in which the vehicle is running forward, but also when the first-direction operation is performed in the state in which the vehicle is running backward.

The command to apply the opposite-direction-operation-dependent braking force may be a command to apply a braking force having a magnitude corresponding to an operation amount of the operating member from the neutral position. That is, the operating device of the present disclosure may issue a command to apply a relatively large magnitude of the opposite-direction-operation-dependent braking force in a case where a relatively large amount of the second-direction operation is performed in the state in which the vehicle is running forward. With this configuration, a relatively large braking force can be applied by a driver's operation in a situation in which sudden braking is required, for instance.

The operating device of the present disclosure may issue a command to apply a braking force when the operating member is located at the neutral position in a state in which the vehicle is running forward. The operating device of the present disclosure may issue a command to apply a braking force when the operating member is located at the neutral position in a state in which the vehicle is running backward. In a case where the operating device is configured such that a force, by which the operating member returns to the neutral position, is given to the operating member by a spring, a motor or the like, the braking force is automatically applied to the vehicle if the driver releases the operating member in a state in which the driver is performing the first-direction operation or the second-direction operation by gripping the operating member. This braking force will be referred to as a neutral-position-dependent braking force. The operating device of the present disclosure may be configured to issue a command to apply the neutral-position-dependent braking force whose magnitude is set such that the vehicle does not come to a sudden stop.

As for a relationship between the opposite-direction-operation-dependent braking force and the neutral-position-dependent braking force, the braking force as the opposite-direction-operation-dependent braking force may be set so as to be larger than the braking force as the neutral-position-dependent braking force. This configuration enables application of a relatively large magnitude of the opposite-direction-operation-dependent braking force to the vehicle when sudden braking or the like is required.

When the vehicle stops by application of the neutral-position-dependent braking force, the operating device of the present disclosure may issue a command to apply, to the vehicle, a braking force by which the vehicle is kept stopped. When the vehicle stops by application of the braking force as the opposite-direction-operation-dependent braking force, the operating device of the present disclosure may issue a command to apply, to the vehicle, a braking force by which the vehicle is kept stopped. Each of these braking forces will be referred to as a stop keeping braking force. With the configurations, even in a situation in which the vehicle is stopped halfway on the slope, for instance, the application of the stop keeping braking force prevents the vehicle from moving down along the slope with its wheels rotated.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

Referring to the drawings, there will be explained below in detail an operating device for a vehicle according to one embodiment of the present disclosure. It is to be understood that the present disclosure is not limited to the details of the following embodiment but may be embodied based on the forms described in Various Forms and may be changed and modified based on the knowledge of those skilled in the art.

Figure 1:
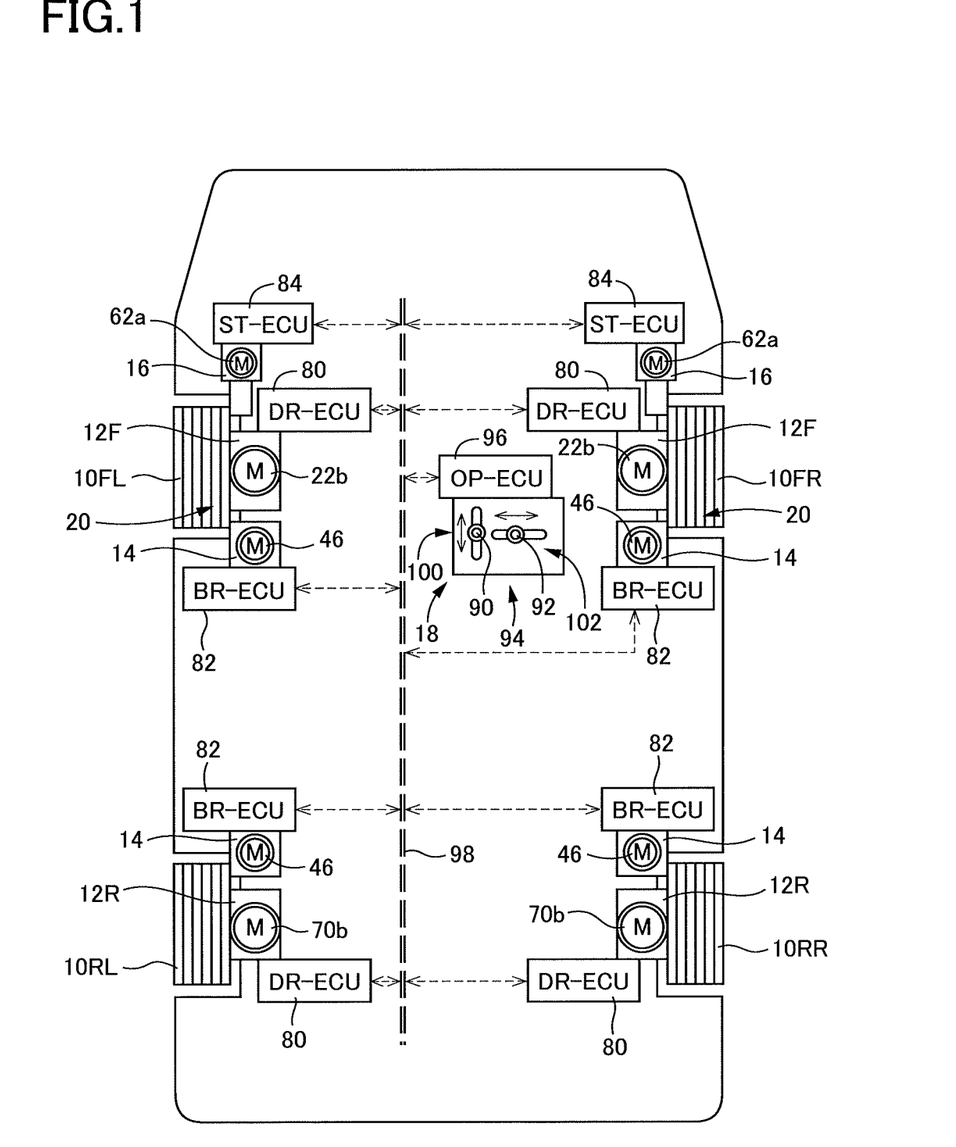
FIG. 1 is a schematic view illustrating an overall structure of a vehicle on which is installed an operating device according to one embodiment.

A. Structure of Vehicle on which Operating Device is Installed i) Overall Structure As illustrated in FIG. 1, a vehicle on which a vehicle operating device according to one embodiment is installed (hereinafter simply referred to as "present vehicle" where appropriate) has four wheels, i.e., front right and left wheels and rear right and left wheels. In the following explanation, the four wheels are represented as a front left wheel 10FL, a front right wheel 10FR, a rear left wheel 10RL, and a rear right wheel 10RR, respectively. When it is not necessary to distinguish the right and left wheels from each other, each of the front left wheel 10FL and the front right wheel 10FR is represented as the front wheel 10F and each of the rear left wheel 10RL and the rear right wheel 10RR is represented as the rear wheel 10R. When it is not necessary to distinguish the four wheels from one another, each of the front left wheel 10FL, the front right wheel 10FR, the rear left wheel 10RL, and the rear right wheel 10RR is represented as the wheel 10.

The present vehicle includes: a drive system including four wheel drive devices 12 configured to drive the respective four wheels 10; a brake system including four wheel brake devices 14 configured to brake the respective four wheels 10; and a steering system including two wheel steering devices 16 configured to steer the respective two front wheels 10F. The vehicle operating device 18 according to the present embodiment (hereinafter simply referred to as "operating device 18" where appropriate) is provided for operating the drive system, the brake system, and the steering system. It is noted that each of the two wheel drive devices 12 corresponding to the two front wheels 10F will be referred to as a front-wheel drive device 12F where appropriate and each of the two wheel drive devices 12 corresponding to the two rear wheels 10R will be referred to as a rear-wheel drive device 12R where appropriate.

i) Hardware Structure on Front-Wheel Side

Figure 2:
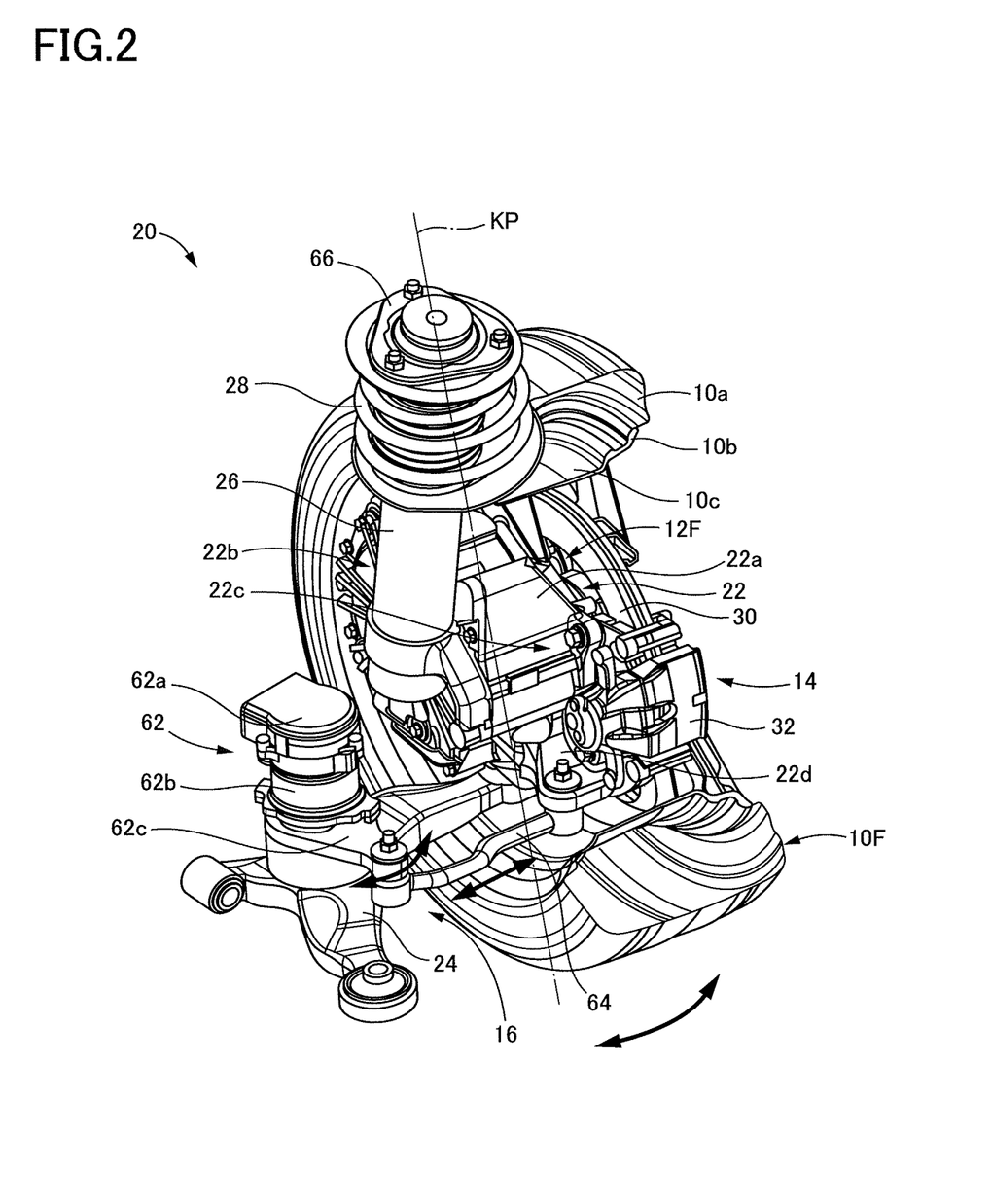
FIG. 2 is a perspective view of a wheel mounting module including a front-wheel drive device, a wheel brake device, and a wheel steering device, the wheel mounting module being for mounting a front wheel on a body of the vehicle.

The front-wheel drive device 12F, the wheel brake device 14, and the wheel steering device 16 provided for each front wheel 12F are incorporated in a wheel mounting module 20 (hereinafter simply referred to as "module 20" where appropriate) illustrated in FIG. 2. The module 20 is for mounting, on a body of the vehicle, a wheel 10b to which a tire 10a is attached. Though the wheel 10b itself may be regarded as the wheel 10, the wheel 10b to which the tire 10a is attached is referred to as the wheel 10 in the present embodiment for convenience sake.

The front-wheel drive device 12F includes, as its main element, a wheel drive unit 22. The wheel drive unit 22 includes: a housing 22a; a drive motor 22b that is an electric motor as a drive source and a speed reducer 22c configured to reduce rotation of the drive motor 22b (both the drive motor 22b and the speed reducer 22c are housed in the housing 22a and are not illustrated in FIG. 2); and an axle hub to which the wheel 10b is attached. (The axle hub is hidden in FIG. 2.). The wheel drive unit 22 is what is called in-wheel motor unit disposed inside a rim 10c of the wheel 10b. The front-wheel drive device 12F is a wheel drive device of an in-wheel motor type. The wheel drive unit 22 is well known and its explanation is dispensed with.

By supplying an electric current to the drive motor 22b, the front-wheel drive device 12F drives the front wheel 10F with a drive force whose magnitude corresponds to an amount of the supplied electric current. There is generated, in the drive motor 22b, an electric current based on an electromotive force generated by rotation of the front wheel 10F. By recovering the generated electric current to the power source, namely, by energy regeneration, a braking force to stop the rotation of the front wheel 10F (hereinafter referred to as "wheel regenerative braking force" where appropriate) can be applied to the front wheel 10F. In other words, by utilizing the drive motor 22b as the generator, the front-wheel drive device 12F functions also as a wheel regenerative brake device.

The module 20 includes a MacPherson-type suspension device (also referred to as a MacPherson strut type suspension device). In the suspension device, the housing 22a of the wheel drive unit 22 functions as a carrier which rotatably holds the wheel and which is allowed to move upward and downward relative to the vehicle body. Further, the housing 22a functions as a steering knuckle of the wheel steering device 16. The suspension device is constituted by a lower arm 24 as a suspension arm, the housing 22a of the wheel drive unit 22, a shock absorber 26, and a suspension spring 28. The suspension device has an ordinary structure and its detailed explanation is dispensed with.

The wheel brake device 14 includes: a disc rotor 30, as a rotation body, attached to the axle hub together with the wheel 10b so as to rotate together with the wheel 10; and a brake caliper 32 held by the housing 22a of the wheel drive unit 22 so as to straddle the disc rotor 30. The brake caliper 32 includes: brake pads each as a friction member; and a brake actuator including an electric motor and configured to push the brake pads by a force of the electric motor against the disc rotor 30 for stopping the rotation of the wheel 10.

Figure 3:
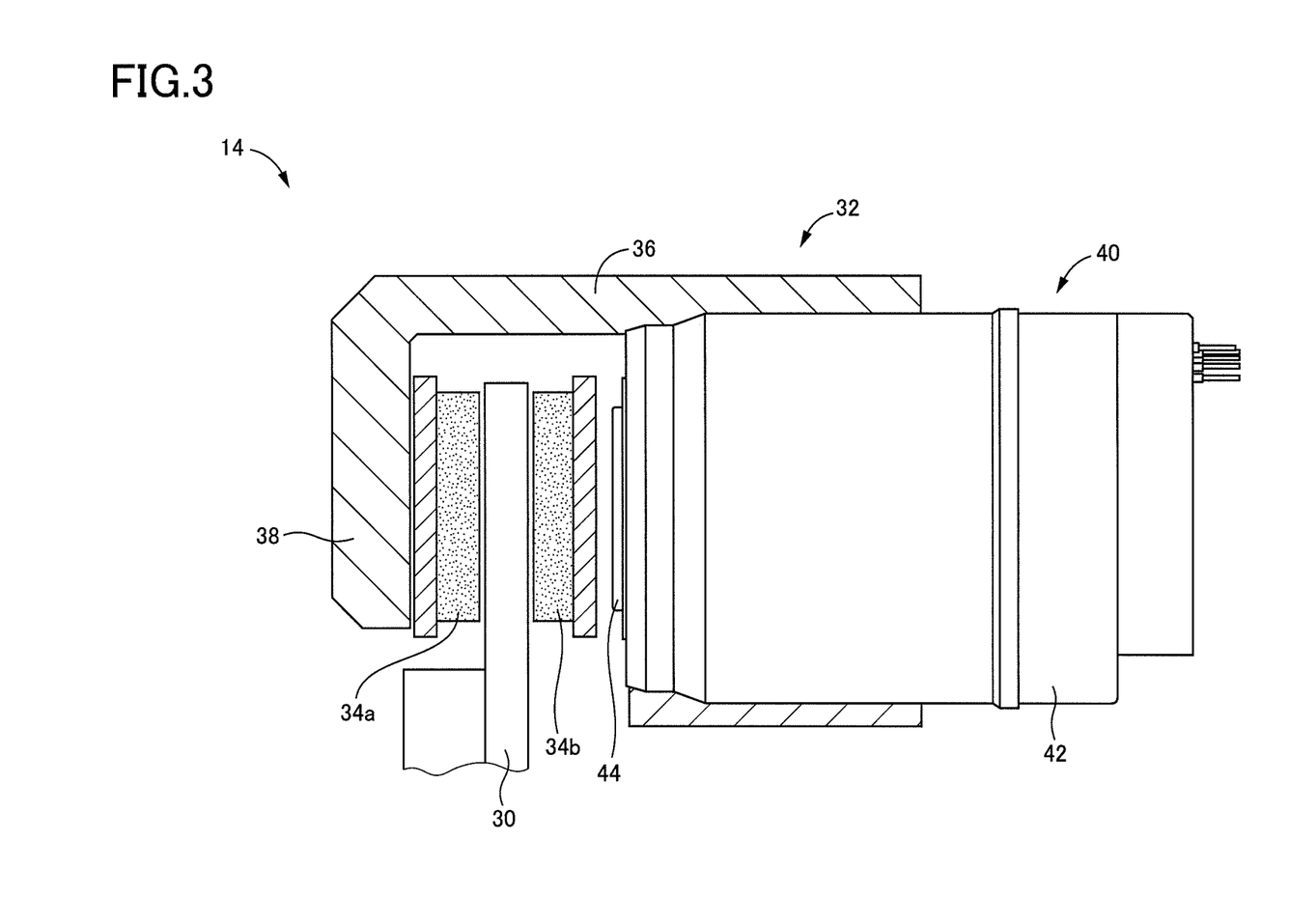
FIG. 3 is a view of the wheel brake device.

Referring to FIG. 3, the wheel brake device 14 will be explained in detail. The brake caliper 32 (hereinafter simply referred to as "caliper 32" where appropriate) is held by a mount provided on the housing 22a of the wheel drive unit 22, such that the caliper 32 is movable in the axial direction (i.e., the right-left direction in FIG. 3) and such that the caliper 32 straddles the disc rotor 30. The brake pads 34a, 34b (hereinafter simply referred to as "pads 34a, 34b" where appropriate) are held by the mount such that the disc rotor 30 is interposed therebetween in a state in which the pads 34a, 34b are movable in the axial direction.

For the sake of convenience, the left side and the right side in FIG. 3 are referred to as a front side and a rear side, respectively. The pad 34a located on the front side is supported by a front end portion (claw portion) 38 of a caliper main body 36. The brake actuator 40 (hereinafter simply referred to as "actuator 40" where appropriate) is held by a rear-side portion of the caliper main body 36 such that a housing 42 of the actuator 40 is fixed to the rear-side portion of the caliper main body 36. The actuator 40 includes a piston 44 held by the housing 42 so as to be advanceable and retractable. When the piston 44 advances, a distal end portion of the piston 44 comes into engagement with the pad 34b located on the rear side. When the piston 44 further advances while being kept engaged with the rear-side pad 34b, the pads 34a, 34b are pushed against the disc rotor 30 such that the disc rotor 30 is sandwiched by and between the pads 34a, 34b. Owing to the pushing by the pads 34a, 34b, there is generated a wheel friction braking force that is a braking force for stopping the rotation of the wheel in dependence on a friction force between the disc rotor 30 and the pads 34a, 34b, in other words, there is generated a braking force for reducing the speed of the vehicle or stopping the vehicle.

Figure 4:
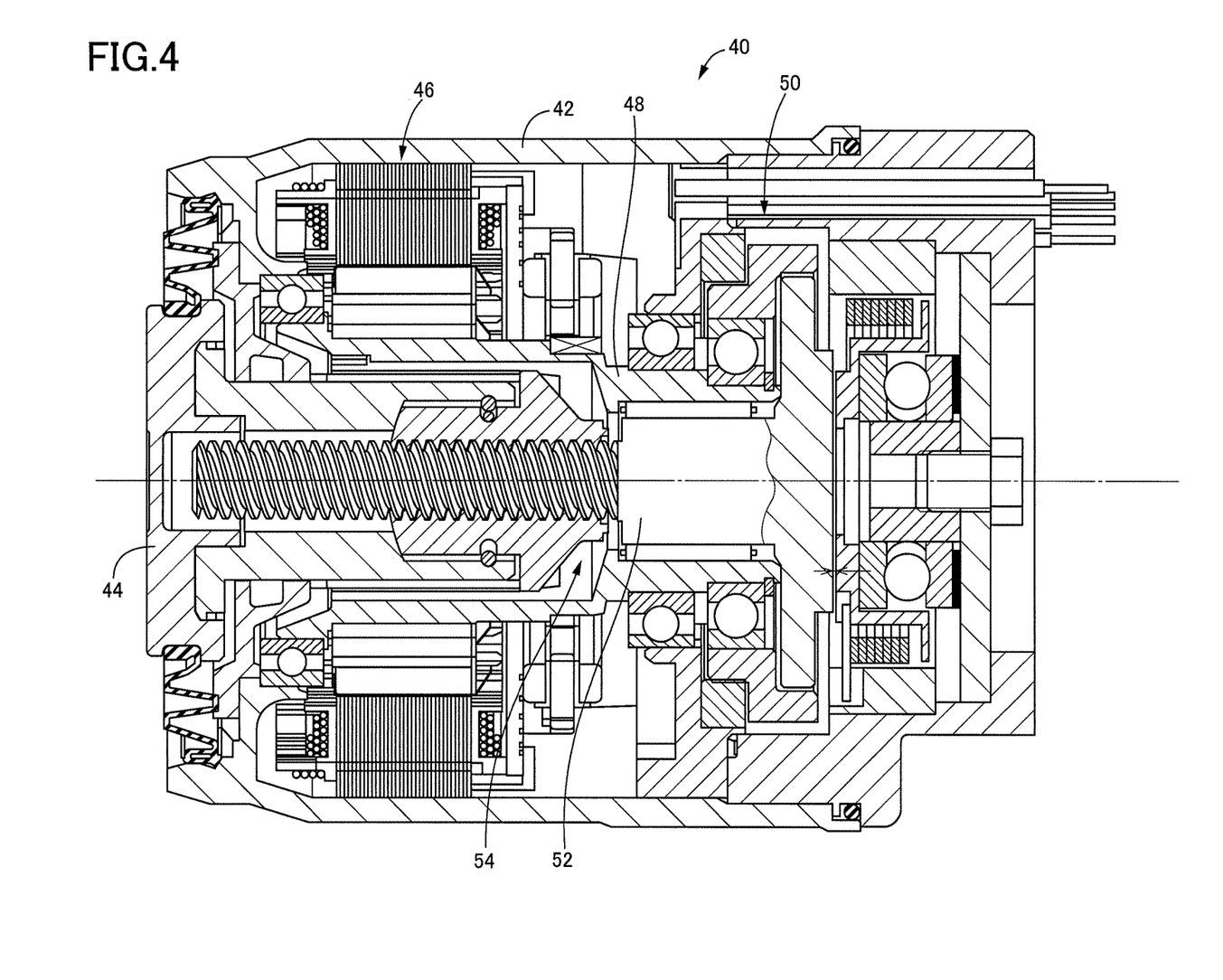
FIG. 4 is a cross-sectional view of a brake actuator of the wheel brake device.

The actuator 40 will be briefly explained referring to a cross-sectional view of FIG. 4. The actuator 40 is an electric brake actuator. The actuator 40 includes, in addition to the housing 42 and the piston 44 described above, a brake motor 46 that is an electric motor as a drive source, a speed reduction mechanism 50 for decelerating rotation of the brake motor 46, specifically, rotation of a hollow motor shaft 48, and a motion converting mechanism 54 including a rotational shaft 52 configured to be rotated by the rotation of the brake motor 46 decelerated by the speed reduction mechanism 50. The motion converting mechanism 54 is configured to convert the rotating motion of the rotational shaft 52 into an advancing and retracting motion of the piston 44. The piston 44 advances and retracts by controlling a supply current to the brake motor 46. The magnitude of the pushing force of the pads 34a, 34b against the disc rotor 30, namely, the magnitude of the wheel friction braking force, is proportional to the amount of the supplied electric current. In this respect, the speed reduction mechanism 50 is a differential speed reduction mechanism including two internally meshing planetary gear mechanisms that are disposed in series. The motion converting mechanism 54 is a screw mechanism. The wheel brake device 14 is an electric brake device including the electric brake actuator 40 and is excellent in response. That is, in the wheel brake device 14, a delay of generation of an actual braking force with respect to the braking force request is small.

Each front wheel 10F is a steerable wheel. As illustrated in FIG. 2, the wheel steering device 16 is disposed in the module 20. The wheel steering device 16 includes a steering actuator 62 fixed to the lower arm 24, a tie rod 64, and a knuckle arm 22d extending from the housing 22a of the wheel drive unit 22. The steering actuator 62 includes a steering motor 62a that is an electric motor as a drive source, a speed reducer 62b for decelerating rotation of the steering motor 62a, and an actuator arm 62c configured to be pivoted by the rotation of the steering motor 62a decelerated by the speed reducer 62b and functioning as a pitman arm. The tie rod 64 connects the actuator arm 62c and the knuckle arm 22d. When the steering motor 62a is activated, the actuator arm 62c is pivoted as indicated by a bold arrow in FIG. 2, and the pivotal movement of the actuator arm 62c is transmitted by the tie rod 64, so that the front wheel 10F is steered about a kingpin axis KP.

In the present embodiment, the wheel drive device 12, the wheel brake device 14, and the wheel steering device 16 are incorporated in the module 20, namely, the wheel drive device 12, the wheel brake device 14, and the wheel steering device 16 are modularized. Thus, a work of mounting the wheel drive device 12, the wheel brake device 14, and the wheel steering device 16 on the vehicle body can be easily performed. That is, a proximal end portion of the lower arm 24 is attached to a side member of the vehicle body, and an upper support 66 that constitutes the shock absorber 26 and an upper portion of the suspension spring 28 is attached to an upper portion of a tire housing of the vehicle body, whereby the module 20 can be mounted on the vehicle, in other words, the wheel drive device 12, the wheel brake device 14, and the wheel steering device 16 can be simultaneously mounted on the vehicle. Thus, the module 20 is excellent in mountability on the vehicle.

ii) Hardware Structure on Rear-Wheel Side

Figure 5:
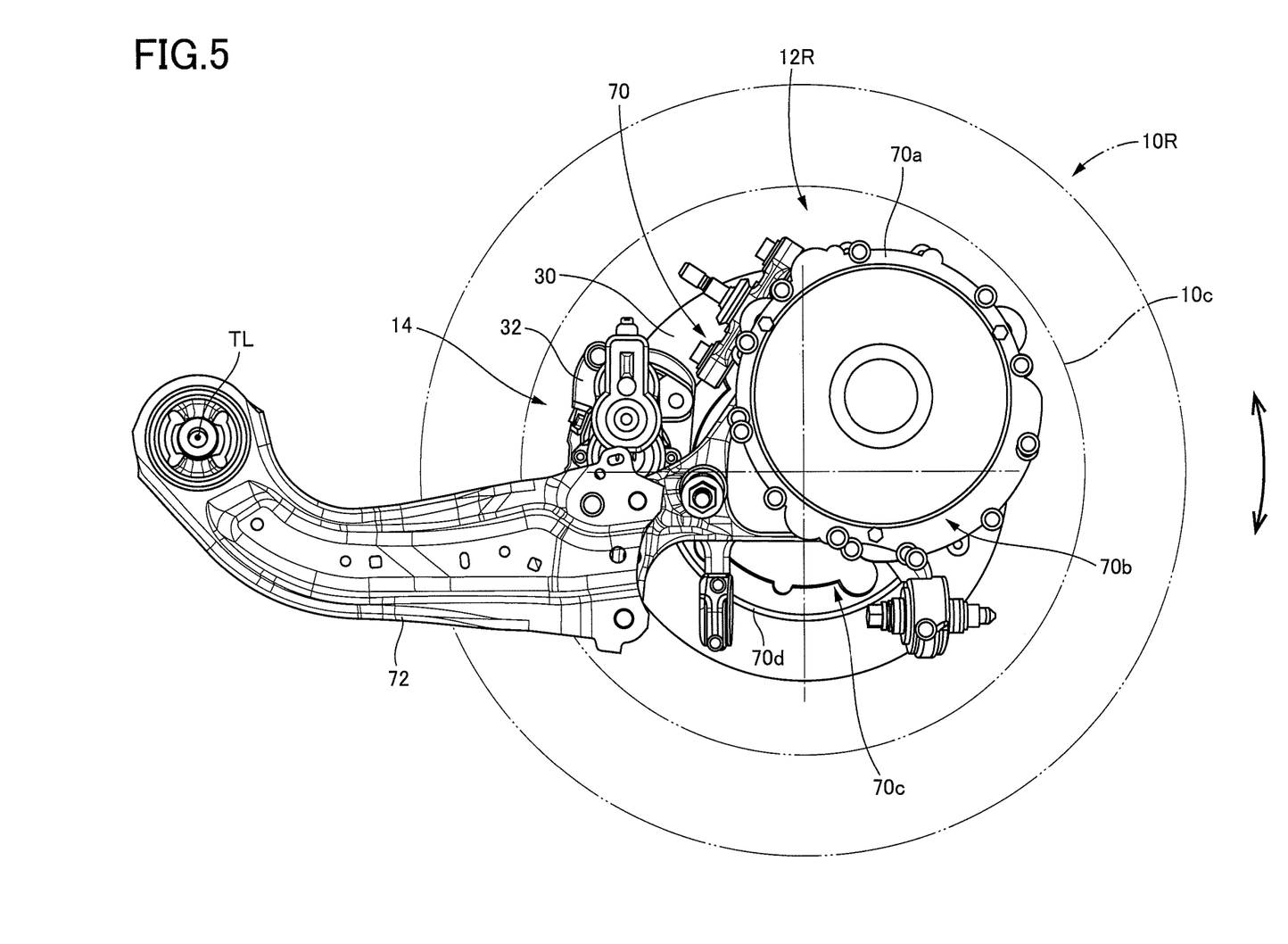
FIG. 5 is a view illustrating a rear-wheel drive device and a wheel brake device provided for a rear wheel.

A suspension device of a trailing arm type is provided for each rear wheel 10R. As illustrated in FIG. 5, a wheel drive unit 70, which is a main constituent element of the rear-wheel drive device 12R, is fixed to a rear end portion of a trailing arm 72. The trailing arm 72 is supported at a front end portion thereof to the vehicle body so as to be pivotable about a pivot axis TL that extends in a width direction of the vehicle. FIG. 5 omits illustration of other constituent elements of the suspension device such as a suspension spring and a shock absorber.

Like the wheel drive unit 22 explained above, the wheel drive unit 70 includes: a housing 70a; a drive motor 70b that is an electric motor as a drive source and a speed reducer 70c configured to reduce rotation of the drive motor 70b (both the drive motor 70b and the speed reducer 70c are incorporated in the housing 70a and are not illustrated in FIG. 5); and an axle hub 70d to which the wheel 10b is attached. The wheel drive unit 70 is what is called in-wheel motor unit disposed inside the rim 10c of the wheel 10b. Like the front-wheel drive device 12F, the rear-wheel drive device 12R is a wheel drive device of an in-wheel motor type. Like the wheel drive unit 22, the wheel drive unit 70 is well known. Thus, the wheel drive unit 70 is not explained here.

Like the front-wheel drive device 12F, by supplying an electric current to the drive motor 70b, the rear-wheel drive device 12R drives the rear wheel 10R with a drive force whose magnitude corresponds to an amount of the supplied electric current. Like the front-wheel drive device 12F, there is generated, in the drive motor 70b, an electric current based on an electromotive force generated by rotation of the rear wheel 10R. By recovering the generated electric current to the power source, namely, by energy regeneration, the wheel regenerative braking force can be applied to the rear wheel 10R. In other words, by utilizing the drive motor 70b as a generator, the rear-wheel drive device 12R functions also as a wheel regenerative brake device. That is, the front-wheel drive devices 12F and the rear-wheel drive devices 12R of the present vehicle constitute a part of the brake system.

The wheel brake device 14 that includes the disc rotor 30 and the brake caliper 32 is provided also for each rear wheel 10R. The wheel brake device 14 provided for the rear wheel 10R is identical in construction with that provided for the front wheel 10F, and its explanation is dispensed with.

ii) Hardware Structure Relating to Control

The drive system includes the four wheel drive devices 12 provided respectively for the four wheels 10. The drive system is capable of applying a wheel drive force and a wheel regenerative braking force to the four wheels 10 independently of each other. The brake system includes the four wheel brake devices 14 provided respectively for the four wheels 10. The brake system is capable of applying the wheel friction braking force to the four wheels 10 independently of each other. As explained above, it may be considered that the brake system also includes the four wheel drive devices 12. The four wheel drive devices 12 are capable of applying the regenerative braking force to the four wheels 10 independently of each other. The steering system includes the two wheel steering devices 16 provided respectively for the two front wheels 10F. The steering system is capable of steering the two front wheels 10F independently of each other.

For applying the wheel drive force and the wheel regenerative braking force to the four wheels 10 independently of each other, the four wheel drive devices 12 are respectively controlled by corresponding four drive electronic control units 80, as illustrated in FIG. 1. Each of the four drive electronic control units 80 will be hereinafter referred to as "drive ECU 80" and is indicated as "DR-ECU" in FIG. 1. The drive motor 22b of the wheel drive unit 22 of each front-wheel drive device 12F and the drive motor 70b of the wheel drive unit 70 of each rear-wheel drive device 12R are three-phase brushless DC motors. The drive ECU 80 functioning as a controller includes: an inverter as a drive circuit of the drive motor 22b, 70b; and a computer including a CPU, a ROM, a RAM, etc., for controlling an operation of drive motor 22b, 70b via the inverter.

For applying the wheel friction braking force to the four wheels 10 independently of each other, the four wheel brake devices 14 are respectively controlled by corresponding four brake electronic control units 82. Each of the four brake electronic control units 82 will be hereinafter referred to as "brake ECU 82" and is indicated as "BR-ECU" in FIG. 1. The brake motor 46 of the actuator 40 of each wheel brake device 14 is a three-phase brushless DC motor. The brake ECU 82 functioning as a controller includes: an inverter as a drive circuit of the brake motor 46; and a computer including a CPU, a ROM, a RAM, etc., for controlling an operation of the brake motor 46 via the inverter.

For steering the front wheels 10F, the two wheel steering devices 16 are respectively controlled by corresponding two steering electronic control units 84. Each of the two steering electronic control units 84 will be hereinafter referred to as "steering ECU 84" and is indicated as "ST-ECU" in FIG. 1. The steering motor 62a of the steering actuator 62 of each wheel steering device 16 is a three-phase brushless motor. The steering ECU 84 functioning as a controller includes: an inverter as a drive circuit of the steering motor 62a; and a computer including a CPU, a ROM, a RAM, etc., for controlling an operation of the steering motor 62a via the inverter.

The operating device 18 includes: an operation receiving device 94 including a driving/braking lever 90 and a steering lever 92 each of which is an operating member in the form of a joystick; and an operation electronic control unit 96 including a computer (that includes a CPU, a ROM, a RAM, etc.,) as a main constituent element. The operation electronic control unit 96 will be hereinafter referred to as "operation ECU 96" and is indicated as "OP-ECU" in FIG. 1. The operation ECU 96 detects operations of the driving/braking lever 90 and the steering lever 92 and issues commands corresponding to the operations of the driving/braking lever 90 and the steering lever 92 to the drive system, the brake system, and the steering system. Thus, the operation ECU 96 functions as a central controller that controls the drive system, the brake system, and the steering system in a centralized manner.

For controlling the drive system, the brake system, and the steering system in a centralized manner by the operation ECU 96, the four drive ECUs 80, the four brake ECUs 82, the two steering ECUs 84, and the one operation ECU 96 are connected to a car area network or controllable area network (CAN) 98, and the drive ECUs 80, the brake ECUs 82, the steering ECUs 84, and the operation ECU 96 can communicate with one another through the CAN 98.

B. Hardware Structure of Operating Device

As explained above, the vehicle operating device 18 includes the operation receiving device 94 and the operation ECU 96. The operation receiving device 94 includes: a driving/braking operation receiving portion 100 that includes the driving/braking lever 90; and a steering operation receiving portion 102 that includes the steering lever 92.

Figure 6:
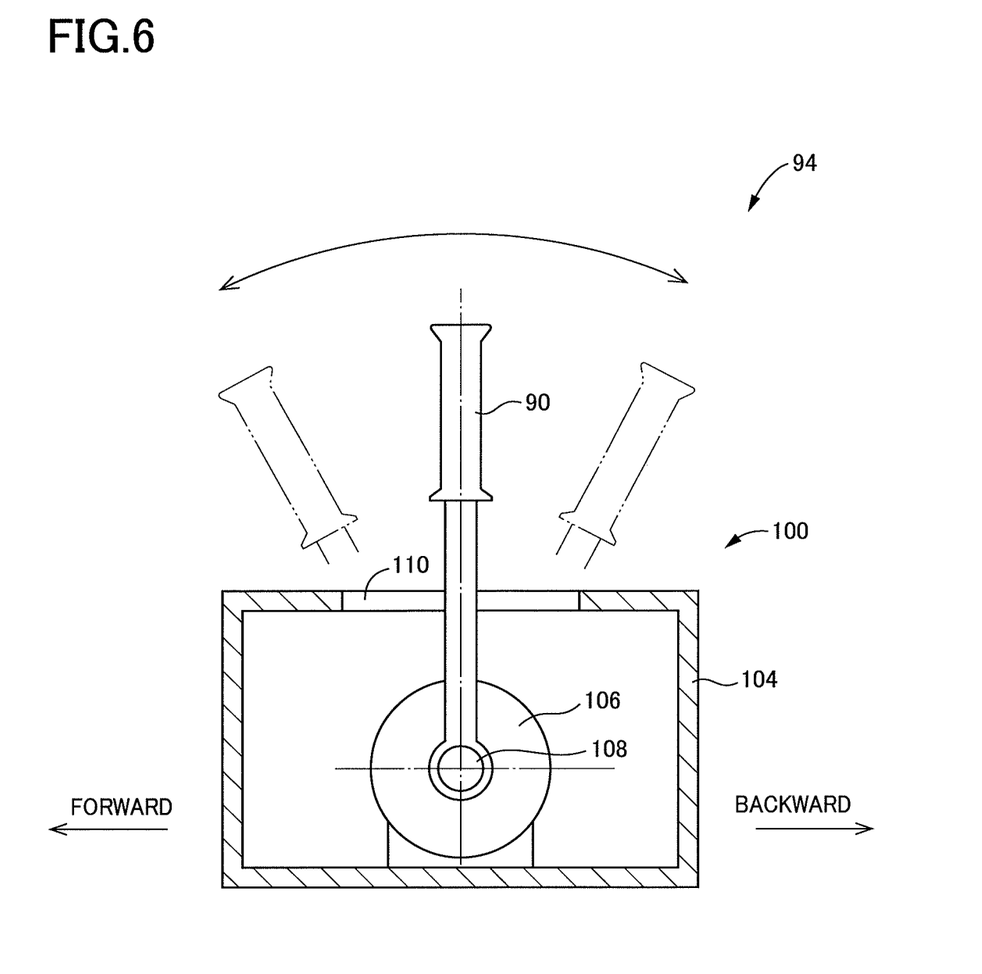
FIG. 6 is a view schematically illustrating a driving/braking operation receiving portion of an operation receiving device that constitutes the operating device of the embodiment.

As schematically illustrated in FIG. 6, the driving/braking operation receiving portion 100 includes a housing 104 and an operation reaction force motor 106, as an electric motor, disposed in the housing 104 so as to be supported by the housing 104. The driving/braking lever 90 is fixedly attached at a proximal end portion thereof to a motor shaft 108 of the operation reaction force motor 106. An upper portion of the driving/braking lever 90 extends upward through a slot 110 that is formed in the housing 104 so as to extend in the front-rear direction. A driver of the vehicle grips the upwardly extending portion of the driving/braking lever 90 to operate or move the same 90 in the front-rear direction. When operated by the driver in the front-rear direction, the driving/braking lever 90 pivots, together with the motor shaft 108, about an axis extending in the right-left direction of the vehicle, namely, an axis of the operation reaction force motor 106.

A position of the driving/braking lever 90 illustrated by the solid line in FIG. 6, namely, a position of the driving/braking lever 90 standing upright, is a neutral position. The driving/braking lever 90 is operated in a forward direction as a first direction and a backward direction as a second direction which are opposite to each other with respect to the neutral position. In other words, the operating device 18 allows: a forward operation as an operation of the driving/braking lever 90 in a first direction from the neutral position, i.e., a first-direction operation; and a backward operation as an operation of the driving/braking lever 90 in a second direction from the neutral position, i.e., a second-direction operation. In a strict sense, the forward operation as the first-direction operation is an operation of the driving/braking lever 90 performed by the driver in a state in which the driving/braking lever 90 is located on a first direction side with respect to the neutral position, and the backward operation as the second-direction operation is an operation of the driving/braking lever 90 performed by the driver in a state in which the driving/braking lever 90 is located on a second direction side with respect to the neutral position.

The operation reaction force motor 106 is a three-phase brushless motor with a speed reducer. The operation reaction force motor 106 is configured to apply a torque in a direction in which the driving/braking lever 90 returns to the neutral position against the operation of the driving/braking lever 90. Specifically, a force by which the driving/braking lever 90 is moved backward is applied to the driving/braking lever 90 against the forward operation thereof while a force by which the driving/braking lever 90 is moved forward is applied to the driving/braking lever 90 against the backward operation thereof. Each of those forces is a reaction force against the operation of the driving/braking lever 90 performed by the driver.

The steering operation receiving portion 102 includes the steering lever 92, in place of the driving/braking lever 90. The steering operation receiving portion 102 differs from the driving/braking operation receiving portion 100 only in that the driving/braking lever 90 is operated in the front-rear direction whereas the steering lever 92 is operated in the right-left direction. The steering operation receiving portion 102 also includes an operation reaction force motor. Thus, illustration and detailed explanation of the steering operation receiving portion 102 are dispensed with.

As explained above, the operation ECU 96 functions as the central controller. The operation ECU 96 includes: the computer including the CPU, the ROM, the RAM, etc.; the operation reaction force motor 106 for applying an operation reaction force to each of the driving/braking lever 90 and the steering lever 92; an inverter as a drive circuit (driver) of the operation reaction force motor 106. The operation ECU 96 has an ordinary configuration, and detailed explanation thereof is dispensed with.

C. Functions of Operation Electronic Control Unit

The operation ECU 96 executes (a) a driving/braking operation reaction force control to control the operation reaction force against the operation of the driving/braking lever 90 and a steering operation reaction force control for controlling the operation reaction force against the operation of the steering lever 92, (b) a driving/braking control to determine the drive force and the braking force to be applied to the vehicle based on the operation of the driving/braking lever 90 and to issue, based on the drive force and the braking force, activation commands to the drive system and the brake system, namely, to the wheel drive device 12 and the wheel brake device 14 of each wheel 10, and (c) a steering control to determine, based on the operation of the steering lever 92, a slip angle of a vehicle body to be attained in the vehicle (hereinafter referred to as "vehicle-body slip angle" where appropriate) and to issue, based on the vehicle-body slip angle, activation commands to the steering system, namely, to the wheel steering device 16 of each front wheel 10F. Hereinafter, the controls will be explained in order to explain functions of the operation ECU 96.

i) Driving/Braking Operation Reaction Force Control and Steering Operation Reaction Force Control The operation ECU 96 executes the driving/braking operation reaction force control in the following manner. The operation ECU 96 constantly recognizes a rotation angle (rotational phase) of the operation reaction force motor 106 and identifies, based on the rotation angle, an operation amount (operation angle) of the driving/braking lever 90 from the neutral position thereof. Based on the operation amount, in other words, by multiplying the operation amount by a set gain, the operation ECU 96 determines a torque to be generated by the operation reaction force motor 106 for returning the driving/braking lever 90 to the neutral position. Based on the determined torque, the operation ECU 96 determines a supply current to the operation reaction force motor 106. The determined supply current is supplied by the inverter to the operation reaction force motor 106. In this respect, the torque applied to the driving/braking lever 90 increases in accordance with the operation amount, in other words, the torque applied to the driving/braking lever 90 increases with an increase in the operation amount. Thus, an operation feeling as if the driving/braking lever 90 is supported by a spring is given to the driver.

The operation ECU 96 executes the steering operation reaction force control in a manner similar to a manner in which the driving/braking operation reaction force control is executed. While not explained in detail, a torque similar to that applied to the driving/braking lever 90, namely, a torque whose magnitude corresponds to the operation amount of the steering lever 92 from the neutral position, is applied to the steering lever 92 by execution of the steering operation reaction force control.

ii) Driving/Braking Control

In the driving/braking control, the operation ECU 96 issues, to the drive system and the brake system, commands corresponding to the driver's operation of the driving/braking lever 90 based on a running state of the vehicle. The drive ECU 80 of the wheel drive device 12 of each wheel 10 constantly transmits information on a rotational direction of the corresponding drive motor 22b, 70b to the operation ECU 96 via the CAN 98. Based on the information transmitted from the drive ECUs 80, the operation ECU 96 identifies whether the vehicle is running forward, the vehicle is running backward, or the vehicle is at a stop.

As explained above, the operation ECU 96 identifies the operation amount of the driving/braking lever 90 from the neutral position. The operation ECU 96 constantly recognizes whether the forward operation is performed at the present time or the backward operation is performed at the present time, or whether neither the forward operation nor the backward operation is performed at the present time, namely, whether the driving/braking lever 90 is located at the neutral position at the present time.

When the forward operation of the driving/braking lever 90 is performed in a state in which the vehicle is at a stop or when the forward operation of the driving/braking lever 90 is performed or being performed in a state in which the vehicle is running forward, the operation ECU 96 issues, to the drive system, a command to apply the drive force in the forward direction, namely, to apply a forward drive torque, to the vehicle. On the other hand, when the backward operation of the driving/braking lever 90 is performed in a state in which the vehicle is at a stop or when the backward operation of the driving/braking lever 90 is performed or being performed in a state in which the vehicle is running backward, the operation ECU 96 issues, to the drive system, a command to apply the drive force in the backward direction, namely, to apply a backward drive torque, to the vehicle. Specifically, regardless of whether the forward drive torque is to be applied or the backward torque is to be applied, the operation ECU 96 transmits, to the drive ECU 80 of each wheel drive device 12 via the CAN 98, information on the drive torque that should be applied, in order to apply, to each wheel 10, the drive torque corresponding to the operation amount from the neutral position. Based on the information on the drive torque, each drive ECU 80 supplies the electric current to the drive motor 22b, 70b of the corresponding wheel drive device 12.

As explained above, when the driver releases the driving/braking lever 90, the driving/braking lever 90 is brought into the neutral position by the operation reaction force. Such a case and a case where the driving/braking lever 90 is brought into the neutral position by being operated by the driver will be explained. In these cases, when the driving/braking lever 90 is brought into the neutral position in a state in which the vehicle is running forward or backward, the operation ECU 96 issues, to the brake system, a command to apply the braking force to the vehicle. The braking force in this instance will be referred to as "neutral-position-dependent braking force". The neutral-position-dependent braking force is set to a braking force having a magnitude that enables the vehicle to gently stop. In this respect, the neutral-position-dependent braking force is set so as to become small immediately before the vehicle comes to a stop for reducing swinging back of the vehicle body upon stopping.

On the other hand, when the backward operation of the driving/braking lever 90 is performed in a state in which the vehicle is running forward and when the forward operation of the driving/braking lever 90 is performed in a state in which the vehicle is running backward, the operation ECU 96 issues, to the brake system, a command to apply a braking force to the vehicle. The braking force in this instance will be referred to as "opposite-direction-operation-dependent braking force". Unlike the neutral-position-dependent braking force, the opposite-direction-operation-dependent braking force is not a predetermined braking force. That is, the opposite-direction-operation-dependent braking force is determined by the operation ECU 96 to be a braking force having a magnitude corresponding to the operation amount from the neutral position. The opposite-direction-operation-dependent braking force is determined so as to be larger than the neutral-position-dependent braking force in view of emergency braking such as sudden braking.

Each of the neutral-position-dependent braking force and the opposite-direction-operation-dependent braking force are given by the regenerative braking force with a higher priority. In other words, only a shortage in the neutral-position-dependent braking force that cannot be given by the regenerative braking force or only a shortage in the opposite-direction-operation-dependent braking force that cannot be given by the regenerative braking force is compensated for by the braking force generated by the wheel brake devices 14 of the respective wheels 10. The drive ECU 80 of the wheel drive device 12 of each wheel 10 recognizes a charged amount of a battery from which the electric current is supplied to the corresponding drive motor 22b, 70b. Further, each ECU 80 also recognizes the rotation speed of the corresponding drive motor 22b, 70b, namely, the rotation speed of the corresponding wheel 10. Based on the charged amount of the battery and the rotation speed of the drive motor 22b, 70b, each drive ECU 80 constantly identifies a maximum regenerative braking force that can be generated in the corresponding wheel drive device 12 and transmits information on the maximum regenerative braking force via the CAN 98.

Based on i) the maximum regenerative braking force for each wheel 10 that can be generated and ii) the neutral-position-dependent braking force to be applied or the opposite-direction-operation-dependent braking force to be applied, the operation ECU 96 determines whether or not the neutral-position-dependent braking force or the opposite-direction-operation-dependent braking force can be given by the regenerative braking force. When the neutral-position-dependent braking force or the opposite-direction-operation-dependent braking force can be given by the regenerative braking force, the operation ECU 96 transmits, to each drive ECU 80 via the CAN 98, a command to apply the neutral-position-dependent braking force or the opposite-direction-operation-dependent braking force by the regenerative braking force. Each drive ECU 80 activates, based on the command, the inverter as the drive circuit of the corresponding drive motor 22b, 70b. On the other hand, when the neutral-position-dependent braking force or the opposite-direction-operation-dependent braking force cannot be given by the regenerative braking force, the operation ECU 96 determines the shortage in the neutral-position-dependent braking force or the shortage in the opposite-direction-operation-dependent braking force. The shortage in the neutral-position-dependent braking force or the shortage in the opposite-direction-operation-dependent braking force will be referred to as an insufficient braking force where appropriate. The operation ECU 96 then transmits, to the drive ECUs 80 via the CAN 98, a command to apply the maximum regenerative braking force that can be generated and transmits, to the brake ECUs 82 of the respective wheel brake devices 14 via the CAN 98, a command to apply the braking force corresponding to the insufficient braking force. Each drive ECU 80 activates, based on the command, the inverter as the drive circuit of the corresponding drive motor 22b, 70b. Each brake ECU 82 activates, based on the command, the inverter of the drive circuit of the corresponding brake motor 46.

When the vehicle comes to a stop by the neutral-position-dependent braking force or the opposite-direction-operation-dependent braking force, the operation ECU 96 issues, to the brake system, a command to apply a braking force by which the vehicle is kept stopped. The braking force in this instance will be referred to as "stop keeping braking force". The magnitude of the stop keeping braking force is set such that the vehicle stopped on a slope or the like is prevented from moving down along the slope with its wheels rotated. Specifically, the operation ECU 96 transmits information on the set stop keeping braking force to the brake ECUs 82 of the respective wheel brake devices 14 via the CAN 98. Each brake ECU 82 activates the inverter as the drive circuit of the corresponding brake motor 46 based on the stop keeping braking force.

When the forward operation or the backward operation of the driving/braking lever 90 is performed to move the vehicle forward or backward in a state in which the vehicle is at a stop while the stop keeping braking force is being applied thereto, the stop keeping braking force being applied is canceled. In a situation in which the vehicle is at a stop on a slope or the like, the cancellation of the stop keeping braking force may cause the vehicle to move down along the slope with its wheels rotated, in a direction opposite to a direction in which the vehicle is to run. In view of this, in a case where the vehicle moves in the opposite direction or in a case where it is estimated that the vehicle will move in the opposite direction, the stop keeping braking force is kept applied until the drive force is increased to such an extent that the movement of the vehicle in the opposite direction is not caused.

The driving/braking control explained above enables application of an appropriate drive force and an appropriate braking force to the vehicle by operating a single operating member, i.e., namely, by operating only the driving/braking lever 90. The opposite-direction-operation-dependent braking force, in particular, ensures a sufficient braking force in the event of emergency such as when sudden braking or the like is required.

iii) Steering Control

As explained above, the operation ECU 96 identifies the operation amount of the driving/braking lever 90 from the neutral position. Likewise, the operation ECU 96 identifies the operation amount of the steering lever 92 from the neutral position. The operation ECU 96 constantly recognizes whether a leftward operation is performed at the present time or a rightward operation is performed at the present time, or whether neither the leftward operation nor the rightward operation is performed at the present time, namely, whether the steering lever 92 is located at the neutral position at the present time. When the leftward operation or the rightward operation is performed, the operation ECU 96 determines, based on the operation amount, the vehicle-body slip angle to be attained in the vehicle and determines steering angles for the respective two front wheels 10F based on the vehicle-body slip angle. The operation ECU 96 transmits information on the steering angles to the steering system, namely, to the steering ECU 84 of the wheel steering device 16 of each front wheel 10F via the CAN 98. Each steering ECU 84 activates the inverter as the drive circuit of the corresponding steering motor 62a to attain the steering angle.

D. Flow of Driving/Braking Control and Changes in Drive Force and Braking Force to be Applied i) Control Flow The computer of the operation ECU 96 repeatedly executes a driving/braking control program represented by a flowchart of FIG. 7 at a short time pitch from several to several tens of milliseconds (msec) for executing the driving/braking control. Hereinafter, there will be briefly explained a flow of the control process according to the program and, in particular, the commands issued to the drive system and the brake system in accordance with the operation of the driving/braking lever 90 and the running state of the vehicle.

Figure 7:
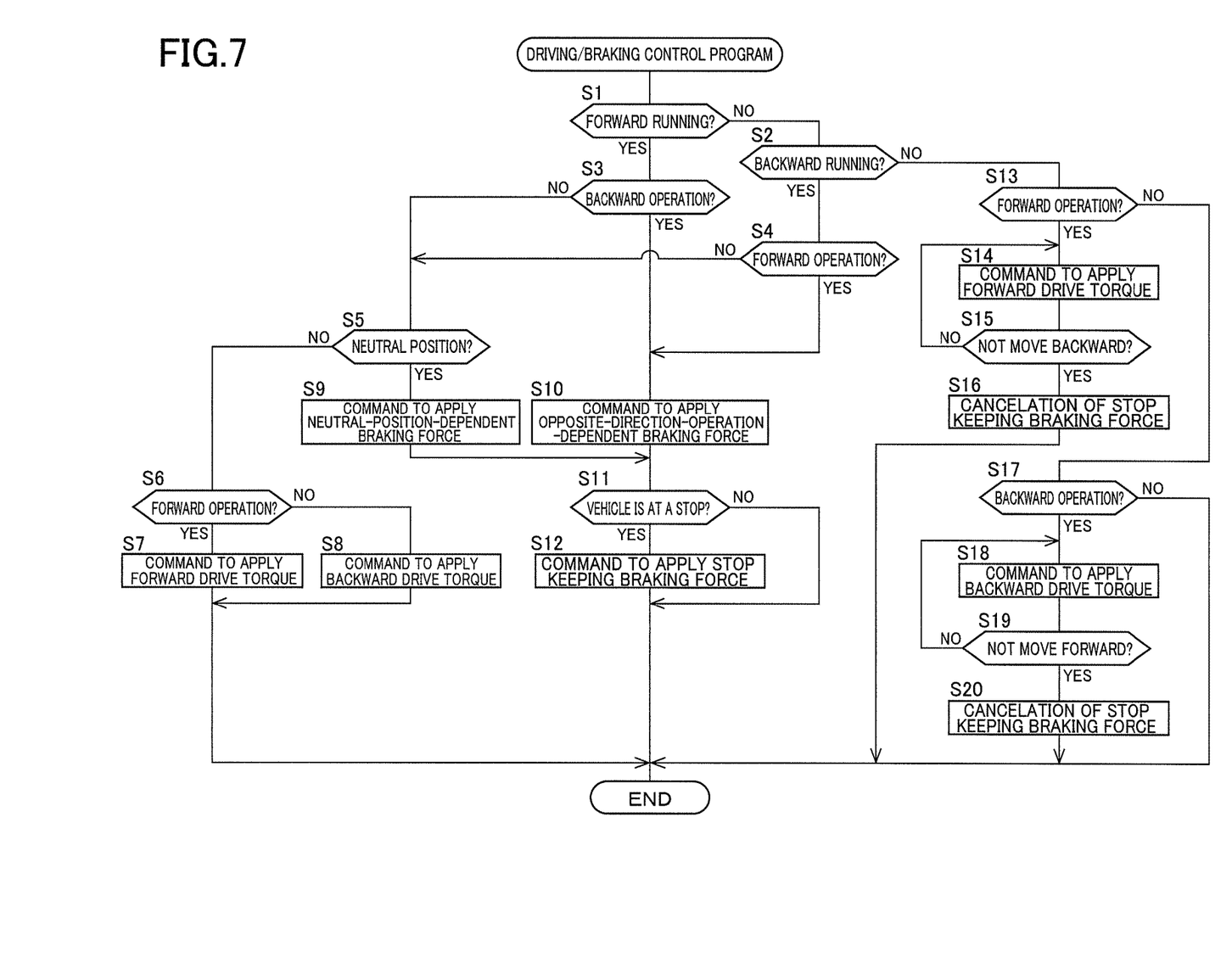
FIG. 7 is a flowchart representing a driving/braking control program executed in the operating device of the embodiment.

In the process according to the driving/braking control, it is determined at Step 1 whether the vehicle is running forward based on information from the drive ECUs 80. (Hereinafter, Step S1 is abbreviated as "S1". Other steps are similarly abbreviated.) It is determined at S2 whether the vehicle is running backward based on information from the drive ECUs 80. When the vehicle is running forward, it is determined at S3 whether the backward operation of the driving/braking lever 90 is performed. When the vehicle is running backward, it is determined at S4 whether the forward operation of the driving/braking lever 90 is performed.

When the vehicle is running forward and the backward operation of the driving/braking lever 90 is not performed and when the vehicle is running backward and the forward operation of the driving/braking lever 90 is not performed, it is determined at S5 whether the driving/braking lever 90 is currently located at the neutral position. When the driving/braking lever 90 is not currently located at the neutral position, it is determined at S6 which one of the forward operation of the driving/braking lever 90 and the backward operation of the driving/braking lever 90 is performed. When the forward operation is performed, the control flow proceeds to S7 at which the command to apply the forward drive torque corresponding to the operation amount of the driving/braking lever 90 from the neutral position is issued to the drive ECUs 80 as explained above. When the backward operation is performed, the control flow proceeds to S8 at which the command to apply the backward drive torque corresponding to the operation amount of the driving/braking lever 90 from the neutral position is issued to the drive ECUs 80.

When it is determined at S5 that the driving/braking lever 90 is currently located at the neutral position, the control flow proceeds to S9 at which there is issued, to the drive ECUs 80 or both the drive ECUs 80 and the brake ECUs 82, the command to apply the neutral-position-dependent braking force that is set so as to enable the vehicle to gently stop. When the vehicle is running forward and the backward operation of the driving/braking lever 90 is performed or when the vehicle is running backward and the forward operation of the driving/braking lever 90 is performed, the control flow proceeds to S10 at which there is issued, to the drive ECUs 80 or both the drive ECUs 80 and the brake ECUs 82, the command to apply the opposite-direction-operation-dependent braking force whose magnitude corresponds to the operation amount of the driving/braking lever 90 from the neutral position.

When the command as to the neutral-position-dependent braking force or the command as to the opposite-direction-operation-dependent braking force is issued, the control flow proceeds to S11 to determine whether the vehicle is at a stop, in other words, whether the vehicle is stopped by the braking force. When the vehicle is at a stop, the control flow proceeds to S12 at which the command to apply the stop keeping braking force is issued to the brake ECUs 82.

When it is determined as a result of the determinations at S1 and S2 that the vehicle is at a stop, it is determined at S13 whether the forward operation of the driving/braking lever 90 is performed. When the forward operation of the driving/braking lever 90 is performed, the control flow proceeds to S14 at which there is issued, to the drive ECUs 80, the command to apply the forward drive torque whose magnitude corresponds to the operation amount of the driving/braking lever 90 from the neutral position, so as to cause the vehicle to start running forward. After waiting for the forward drive torque to be increased until it can be confirmed at S15 that the vehicle will not move backward, the command to cancel the stop keeping braking force is issued to the brake ECUs 82 at S16.

On the other hand, when it is determined at S13 that the forward operation of the driving/braking lever 90 is not performed, the control flow proceeds to S17 to determine whether the backward operation of the driving/braking lever 90 is performed. When the backward operation is performed, the control flow proceeds to S18 at which there is issued, to the drive ECUs 80, the command to apply the backward drive torque whose magnitude corresponds to the operation amount of the driving/braking lever 90 from the neutral position, so as to cause the vehicle to start running backward. After waiting for the backward drive torque to be increased until it can be confirmed at S19 that the vehicle will not move forward, the command to cancel the stop keeping braking force is issued to the brake ECUs 82 at S20.

The technique of confirming at S15 that the vehicle will not move backward and the technique of confirming at S19 that the vehicle will not move forward are not limited to particular techniques. For instance, it may be identified that the vehicle will not move backward or the vehicle will not move forward based on a fact that the electric current being actually supplied to each drive motor 22b, 70b increases up to a certain level.

ii) Changes of Applied Drive force and Applied Braking Force

Figure 8:
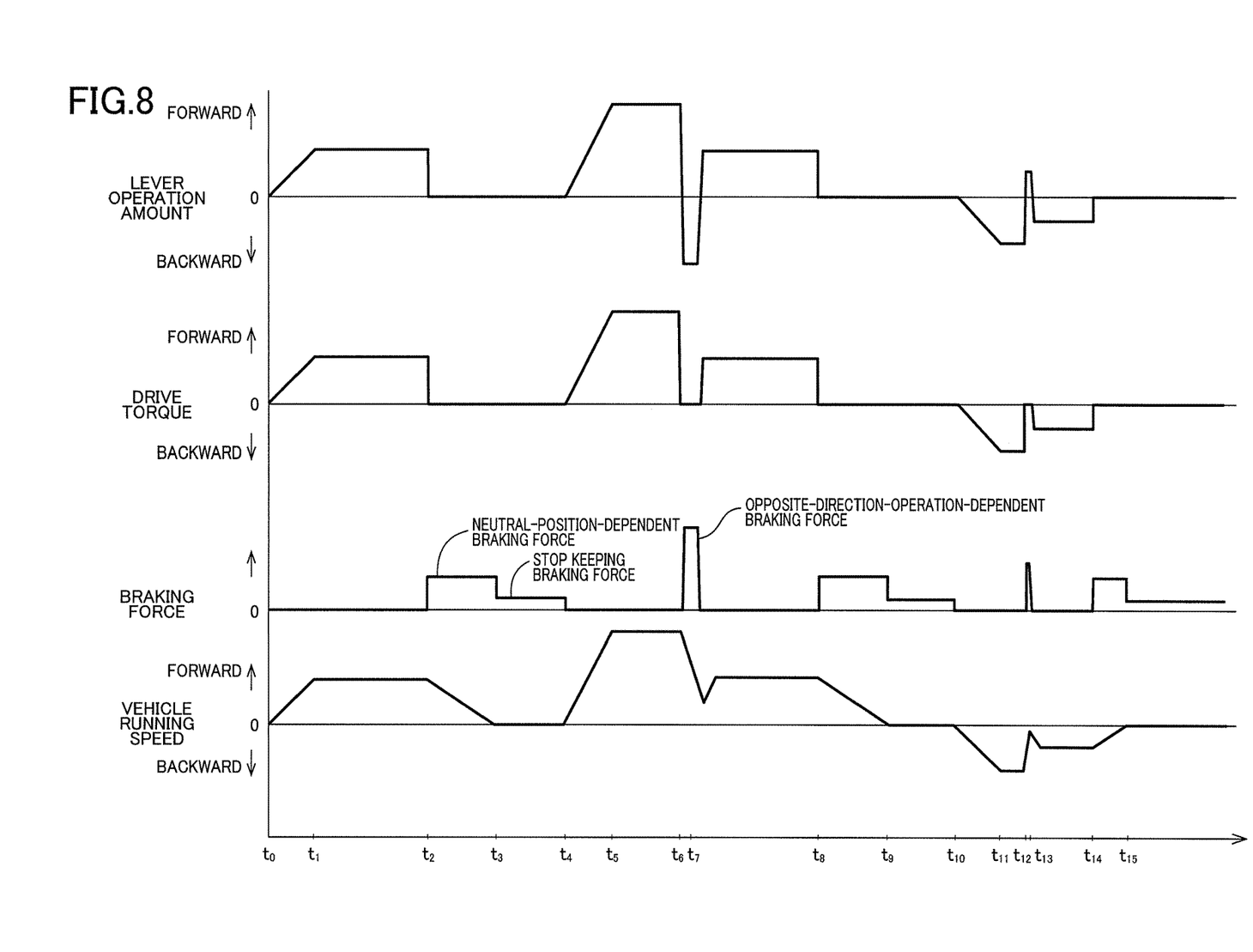
FIG. 8 is a graph schematically illustrating changes in a drive force and a braking force applied to the vehicle by processing executed by the operating device of the embodiment.

Referring to the graph of FIG. 8, there will be explained one example of changes in the drive force (the drive torque) and the braking force applied to the vehicle by execution of the driving/braking control program. In the graph of FIG. 8, there are schematically illustrated, on the same time axis t, a change in the operation amount of the driving/braking lever 90 (hereinafter simply referred to as "lever 90" where appropriate) from the neutral position, a change in the drive torque applied to the vehicle, a change in the braking force applied to the vehicle, and a change in a running speed of the vehicle (hereinafter referred to as "vehicle running speed" where appropriate) as the running state of the vehicle. Each of the operation amount of the driving/braking lever 90, the drive torque, and the vehicle running speed is indicated such that values thereof larger than 0 are values in the forward direction (on a forward-running side), and values thereof smaller than 0 are values in the backward direction (on a backward-running side).

As apparent from the graph, when the driver relatively gently performs the forward operation of the lever 90 to a certain operation amount from a time $t_0$ to a time $t_1$, the forward drive torque and the forward running speed increase from the time $t_0$ to the time $t_1$ in accordance with the operation. By maintaining the operation amount from the time $t_1$ to a time $t_2$, the drive torque and the vehicle running speed are maintained from the time $t_1$ to the time $t_2$.

When the driver releases the lever 90 at the time $t_2$, the lever 90 is brought into the neutral position by the operation reaction force, so that the forward drive torque stops to be applied and the neutral-position-dependent braking force is applied. By applying the neutral-position-dependent braking force, the forward running speed is gently lowered, and the vehicle comes to stop at a time $t_3$. When the vehicle comes to stop, the stop keeping braking force is applied from the time $t_3$.

Subsequently when the forward operation of the lever 90 is relatively rapidly performed to a relatively large operation amount from a time $t_4$ to a time $t_5$, the stop keeping braking force is canceled at the time $t_4$. In accordance with the operation, from the time $t_4$ to a time $t_5$, the forward drive torque that relatively largely and rapidly increases is applied and the vehicle running speed increases largely and rapidly. Subsequently when the driver performs, at a time $t_6$, the backward operation of the lever 90 beyond the neutral position, the forward drive torque stops to be applied, the opposite-direction-operation-dependent braking force with a relatively large magnitude is applied in accordance with the operation amount of the lever 90 from the neutral position in the backward operation, and the forward running speed is largely lowered. When the driver again performs the forward operation of the lever 90 at a time $t_7$ after a lapse of a slight time, the opposite-direction-operation-dependent braking force is canceled and the forward drive torque is again applied. The application of the forward drive torque causes the forward running speed to be increased.

When the driver releases the lever 90 at a time $t_8$, the lever 90 is brought into the neutral position by the operation reaction force, the forward drive torque stops to be applied, and the neutral-position-dependent braking force is applied. By applying the neutral-position-dependent braking force, the forward running speed is gently lowered, and the vehicle comes to stop at a time $t_9$. When the vehicle comes to stop, the stop keeping braking force is applied from the time $t_9$.

When the backward operation of the lever 90 is relatively gently performed to a certain operation amount from a time $t_{10}$ to a time $t_{11}$, the stop keeping braking force is canceled at the time $t_{10}$. In accordance with the operation, the backward drive torque is increased, and the backward running speed is also increased. Subsequently when the driver performs, at a time $t_{12}$, the forward operation of the lever 90 beyond the neutral position, the backward drive torque stops to be applied, the opposite-direction-operation-dependent braking force is applied in accordance with the operation amount of the lever 90 from the neutral position in the forward operation, and the backward running speed is lowered. When the driver again performs the backward operation of the lever 90 at a time $t_{13}$ after a lapse of a slight time, the opposite-direction-operation-dependent braking force is canceled, and the backward drive torque is again applied. The application of the backward drive torque causes the backward running speed to be increased.

When the driver releases the lever 90 at a time $t_{14}$, the lever 90 is brought into the neutral position by the operation reaction force, the backward drive torque stops to be applied, and the neutral-position-dependent braking force is applied. By applying the neutral-position-dependent braking force, the backward running speed is gently lowered, and the vehicle comes to stop at a time $t_{15}$. When the vehicle comes to stop, the stop keeping braking force is applied from the time $t_{15}$.

What is claimed is:

1. An operating device installed on a vehicle and including an operating member operable by a driver, the operating device being configured to issue a command corresponding to an operation of the operating member by the driver to a drive system and a brake system of the vehicle, wherein the operating device allows a first-direction operation that is an operation of the operating member from a neutral position thereof in a first direction and a second-direction operation of the operating member from the neutral position in a second direction different from the first direction, wherein, when the first-direction operation is performed in a state in which the vehicle is at a stop or the vehicle is running forward, the operating device issues, to the drive system, a command to apply a drive force in a forward direction to the vehicle, wherein, when the second-direction operation is performed in a state in which the vehicle is at a stop or the vehicle is running backward, the operating device issues, to the drive system, a command to apply a drive force in a backward direction to the vehicle, and wherein, when the second-direction operation is performed in a state in which the vehicle is running forward, the operating device issues, to the brake system, a command to apply a braking force as an opposite-direction-operation-dependent braking force to the vehicle, wherein, when the vehicle stops by application of the braking force as the opposite-direction-operation-dependent braking force, the operating device issues, to the brake system, a command to apply, to the vehicle, a braking force as a stop keeping braking force by which the vehicle is kept stopped.

2. The operating device according to claim 1, wherein, when the first-direction operation is performed in a state in which the vehicle is running backward, the operating device issues, to the brake system, a command to apply a braking force as the opposite-direction-operation-dependent braking force to the vehicle.

3. The operating device according to claim 1, wherein the braking force as the opposite-direction-operation-dependent braking force is a braking force having a magnitude corresponding to an operation amount of the operating member from the neutral position.

4. The operating device according to claim 1, wherein, when the operating member is located at the neutral position in a state in which the vehicle is running forward, the operating device issues, to the brake system, a command to apply a braking force as a neutral-position-dependent braking force to the vehicle.

5. The operating device according to claim 1, wherein, when the operating member is located at the neutral position in a state in which the vehicle is running backward, the operating device issues, to the brake system, a command to apply a braking force as a neutral-position-dependent braking force to the vehicle.

6. The operating device according to claim 4, wherein the braking force as the opposite-direction-operation-dependent braking force is set so as to be larger than the braking force as the neutral-position-dependent braking force.

7. The operating device according to claim 4, wherein, when the vehicle stops by application of the braking force as the neutral-position-dependent braking force, the operating device issues, to the brake system, a command to apply, to the vehicle, a braking force as a stop keeping braking force by which the vehicle is kept stopped.

* * * * *